(12) United States Patent
Keller et al.

(10) Patent No.: US 6,745,964 B2
(45) Date of Patent: Jun. 8, 2004

(54) APPARATUS FOR COMMINUTING ORGANIC SUBSTANCES

(75) Inventors: Max Keller, Endingen (CH); Eduard Hartmann, Schneisingen (CH)

(73) Assignee: Bucher-Guyer AG, Niederweningen (CH)

( * ) Notice: Subject to any disclaimer, the term of this patent is extended or adjusted under 35 U.S.C. 154(b) by 23 days.

(21) Appl. No.: 10/061,035

(22) Filed: Feb. 1, 2002

(65) Prior Publication Data

US 2002/0109026 A1 Aug. 15, 2002

Related U.S. Application Data (63) Continuation of application No. 09/647,714, filed as application No. PCT/CH00/00029 on Jan. 21, 2000.

(30) Foreign Application Priority Data

Feb. 11, 1999 (CH) .............................................. 0259/99

(51) Int. Cl.[7] .............................................. B02C 19/00
(52) U.S. Cl. ..................... 241/36; 241/278.1; 241/285.3
(58) Field of Search .......................... 241/285.2, 285.3, 241/34, 35, 36, 82.6, 243, 278.1

(56) References Cited

U.S. PATENT DOCUMENTS

| | | | |
|---|---|---|---|
| 2,218,119 A | | 10/1940 | McAllister |
| 2,445,037 A | * | 7/1948 | Richard ..................... 241/82.6 |
| 2,655,967 A | * | 10/1953 | Mallory ..................... 241/82.6 |
| 4,584,919 A | | 4/1986 | Bittner |
| 4,673,135 A | | 6/1987 | Cory |
| 4,683,790 A | | 8/1987 | Bittner |
| 5,743,176 A | | 4/1998 | Anderson et al. |

* cited by examiner

Primary Examiner—Mark Rosenbaum
(74) Attorney, Agent, or Firm—Burns Doane Swecker & Mathis LLP (57) ABSTRACT

A tearing mill for comminuting fruits is equipped with a rotatably supported plate having tearing elements And with a stuffing device with a feed screw for delivering the fruits to the plate. A gap of adjustable width exists between the stuffing device and the plate. By means of an independent control of the gap and the rotational speed of the feed screw and plate, a mash structure of the comminuted fruits is achieved which is well adapted to the type of fruits and to subsequent processing of the mash.

22 Claims, 6 Drawing Sheets

APPARATUS FOR COMMINUTING ORGANIC SUBSTANCES

This is a continuation of application Ser. No. 09/647,714 filed on Oct. 4, 2000, the entire content of which is incorporated herein, which was a U.S. national stage application filed under 35 U.S.C. §371 based on International Application No. PCT/CH00/00029 filed on Jan. 21, 2000, which international application was not published in English by the International Bureau.

FIELD OF THE INVENTION

The invention relates to an apparatus for comminuting organic substances, in particular for tearing apart fruits, including a plate supported rotatably about its axis along with a motor for driving it to rotate, with tearing elements disposed on one face end of the plate, and including means for delivering the organic substances to the face end of the plate.

BACKGROUND OF THE INVENTION

A drum-type cutting machine, particularly for cutting sugar beets into pieces, is known from U.S. Pat. No. 4,584,919 (Bittner). It has a number of retaining elements that are disposed at equal spacings over the circumference of the drum and extend substantially parallel to the axis of the drum. A knife chest in which at least one cutting knife whose cutting edge extends substantially circumferentially is secured is retained between each two retaining elements.

Various embodiments of drum mills of this type are also known for tearing apart fruits, such as the types sold under the name Central by Bucher-Guyer AG, Niederweningen, Switzerland. A drum mill of this kind includes a drum body, made in one piece, over whose circumference retaining elements for the tearing knives are disposed at small spacings. In the operationally ready state, the drum of such a mill forms a substantially closed hollow chamber with a unilateral axial opening through which the fruits to be torn apart are delivered by means of a transporting screw.

In such drum mills, the following disadvantages have been demonstrated:

The fruits, especially apples, revolving at high speed in the drum create major imbalancing forces. The entire mill shakes and causes a great deal of noise. The imbalancing forces also adversely affect the service life of the bearings used for the drum.

Despite variation in terms of tooth pitch of the knives, the structure of the resultant mash can be varied only little. However, this structure influences the mash yield/performance in subsequent pressing operations, and this cannot be improved by optimizing the process.

Foreign bodies in the fruit product, such as stones, cause relatively major imbalance and cause severe damage to the tearing knives.

A fruit stuffing aid and the grinding drum operate at the same rotary speed. The mill fails to function at maximum capacity, since practically no prestuffing takes place. If too little fruit is delivered, the proportion of fine particles in the mash will be very high. This adversely affects the performance of an ensuing pressing operation and leads to clogging of filters for separating solids and liquids.

The casing of the grinding drum with the requisite mash outlet slots is very complicated to manufacture.

A plate-type cutting machine, particularly for cutting sugar beets into pieces, is also known from U.S. Pat. No. 4,683,790 (Bittner). This machine includes a machine stand and a plate cutter with a bearing and a drive mechanism. The plate cutter has a flat top and uniformly distributed openings for the cut-up product, which preferably extend a long way radially. Receptacles for cutting knives are disposed at the openings.

In plate-type cutting machines of the known type, the plate cutter usually comprises a steel plate with rectangular openings for the cut-up product. In such plate mills, the following disadvantages have been demonstrated:

Low capacity, since only part of the plate is acted upon.

A stuffing screw for delivering the product is either missing entirely or runs at the same rotary speed as the plate, leaving to an inadequate stuffing effect.

Excessively large thread pitches of the stuffing screw cause overload or blockage.

The function of the plate mill is only poorly adapted to the type of product to be ground.

The product of a cutting machine is unsuitable as pressing product for juice extraction.

SUMMARY OF THE INVENTION

The object of the invention is to overcome the disadvantages of the known apparatuses for comminuting organic substances through a novel design.

According to the invention, this object is attained in an apparatus of the type defined at the outset in that the means for delivering the organic substances are embodied as a stuffing device with a drive motor, and that the stuffing capacity of the stuffing device and the comminution capacity of the rotatably supported plate are adjustable independently of one another.

The stuffing device preferably includes a feed screw whose axis is located substantially in an extension of the plate axis. Advantageously, the stuffing device delivers the organic substances substantially to the entire end face of the plate via a cylindrical housing, whose outlet is opposite the end face at a spacing distance, and the cylindrical housing includes guide elements which block a rotary motion of the delivered organic substances. The tearing elements, disposed on the face end of the plate, are embodied as a plurality of interchangeably secured, substantially radially-extending tearing strips with sawlike edges, and on the face end of the plate, directly next to the radially-extending tearing strips, at least on one side thereof, there is a groove with an open end on the outer edge of the plate for carrying the comminuted organic substances away.

Advantageous operation of the apparatus is made possible by sensor means for detecting the operative torque in the rotational drive of the rotatably supported plate, as well as control means, operatively connected to the sensor means, for adjusting the stuffing capacity of the stuffing device to a value that corresponds to a predetermined value of this torque.

Further variants of the apparatus are defined by the claims.

BRIEF DESCRIPTION OF THE DRAWING FIGURES

Exemplary embodiments of the invention are described in further detail in the ensuing description and in the drawing figures.

DETAILED DESCRIPTION OF THE INVENTION

Figure 1:
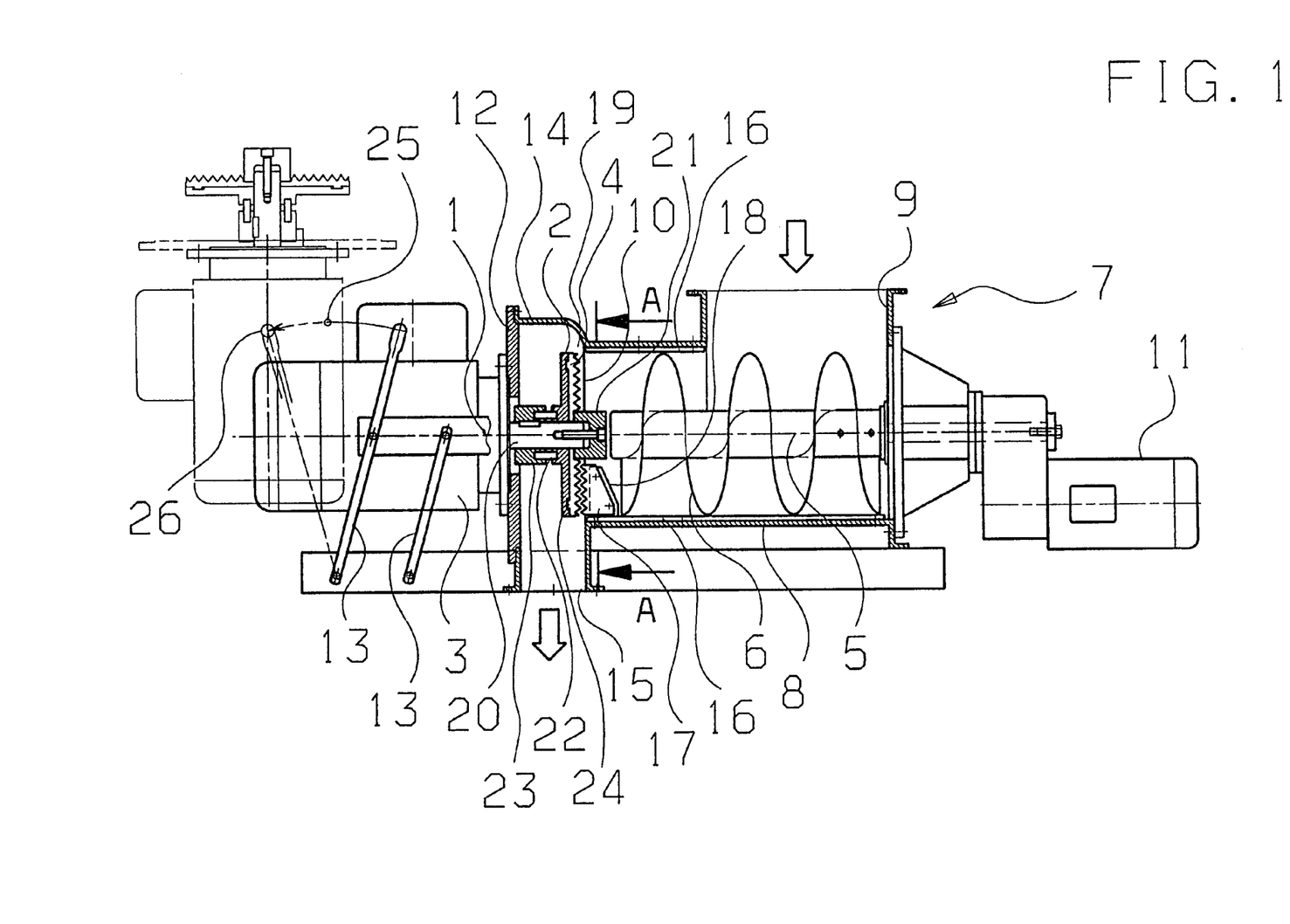
FIG. 1, a schematic cross section through a tearing mill for fruits having a comminution apparatus according to the invention.

As the schematic cross section through a tearing mill for fruits with a comminution apparatus according to the invention shows in FIG. 1, this tearing mill includes a plate 2, supported rotatably about a horizontal axis 1, along with a motor 3 for driving it. On one face end of the plate 2, as shown more precisely in FIG. 7, a plurality of tearing strips 4 are disposed radially. An axis 5 of a feed screw 6 of a stuffing device 7 for delivering organic substances for comminution is disposed in an extension of the axis 1. The feed screw 6 is located in a cylindrical housing 8 with an inlet opening 9 and an outlet 10 located opposite the face end of the plate 2. For driving the feed screw 6, a motor 11 is disposed on the housing 8.

The plate 2 and the feed screw 6 advantageously rotate in opposite directions. The rotary speed of the plate 2 is substantially greater than that of the feed screw 6. The plate 2 along with its motor 3 are mounted on a flange plate 12 which is releasably joined to the housing 8. The group of components comprising the motor 3, flange plate 12 and plate 2 is pivotable away from the housing 8 and into a vertical position of the axis 1 by means of a pivoting device 13. This makes the face end of the plate 2 having the tearing strips 4 readily accessible for purposes of cleaning and tool changing. As FIG. 1 shows, the housing 8 extends beyond the outlet 10 and surrounds the plate 2 with a unilaterally open annular channel 14, which is adjoined at the bottom by a discharge chute 15 for the comminuted organic substances.

For better diversion of the comminuted organic substances separated from the plate 2, the housing 8 forms an acute angle with the plane of the plate, at least in the region of the plate 2. As can be seen in FIG. 1 and in more detail in FIG. 6, four strips 16 are disposed axially parallel on the inside of the casing of the cylindrical housing 8 and act as a rotation block for the organic substances drawn in by the feed screw 6.

These rotation blocks prevent or reduce the product being ground from rotating along with the feed screw 6. The goal is for the fruits, such as apples, to reach the plate 2 in the form of blocks. An overly great relative motion of the apples to one another increases the proportion of fine particles in the ground product. The comminuted mash is spun from the plate 2 into the annular channel 14 of the housing 8. The structure of the mash should be destroyed as little as possible in this operation. Because of the inclined position of the housing 8 in the region of the plate 2, an impact angle of the mash of between 15° and 75° is advantageously attained. The mash then drops to the outside via the discharge chute 15.

Figure 6:
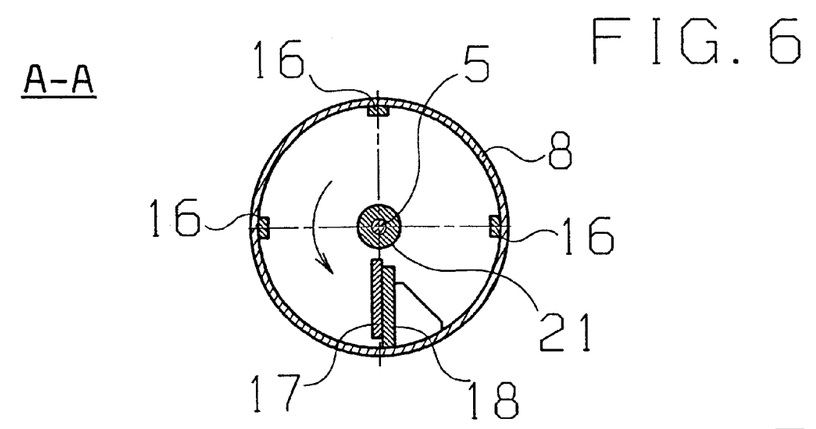
FIG. 6, a cross section through a casing of a cylindrical housing of a stuffing device for delivering product to the tearing mill of FIG. 1.

In addition to the strips 16, a further rotational block 17 with a support plate 18 can be seen at the outlet 10 of the housing 8 in both FIGS. 1 and 6. To improve the tearing action, the tearing strips 4 have sawlike edges, which are engaged by the rotational block 17 during operation of the tearing mill to remove fibers from the teeth using a counterpart set of teeth. The plate 2 is located opposite the outlet 10 of the housing 8, at a spacing distance across a grinding gap 19. The grinding gap 19, together with the fineness of pitch of the sawlike edges of the tearing strips 4 and the rotational speed of the plate 2, substantially determines the structure of the ground product.

Figure 8A:
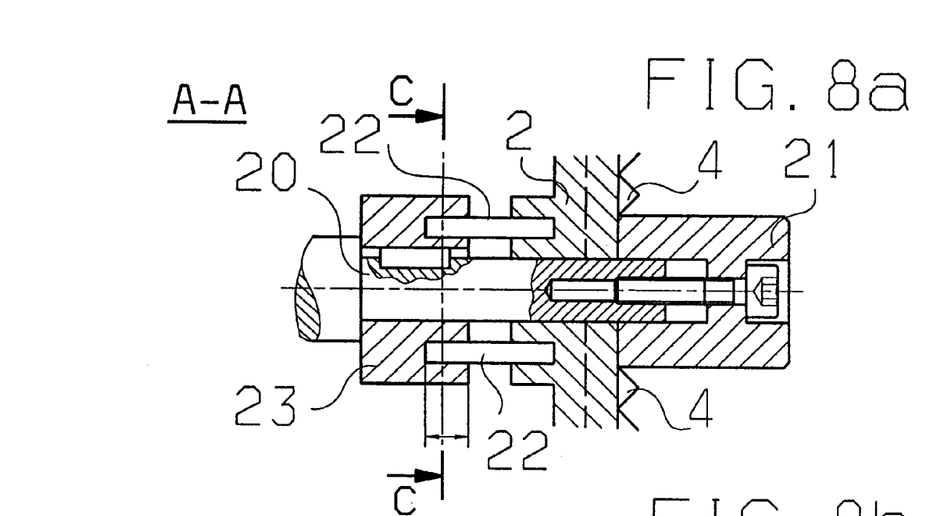
FIGS. 8a, 8b, 8c, two radial longitudinal sections and one radial cross section through a bearing of a turning plate of the tearing mill of FIG. 1 by means of spacer bolts, in various axial positions.
Figure 8B:
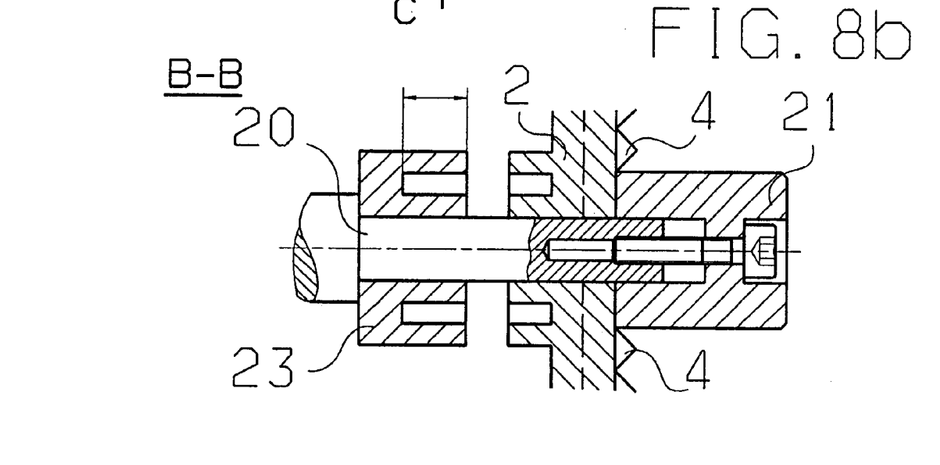
Figure 8C:
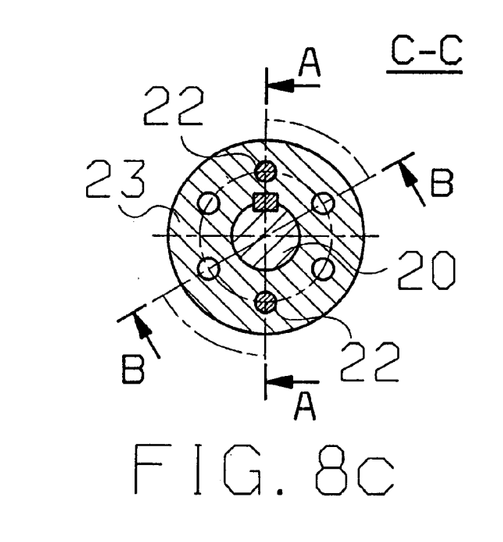

As FIG. 8a in detail shows, in the exemplary embodiment of FIG. 1 the grinding gap 19 can be varied when the apparatus is at a stop. To that end, the plate 2 is anchored on a shaft 20 by means of a fastening cap 21 via spacer bolts 22 in a driver 23. By the introduction of at least two spacer bolts 22 into bores of different depths in the driver 23, the spacing between the plate 2 and the driver 23, and thus the grinding gap 19, can be varied. FIG. 8c shows a section corresponding to FIG. 8a perpendicular to the shaft 20, along the line C—C. The sectional plane of FIG. 8a is represented in FIG. 8c by the line A—A. The sectional plane of FIG. 8b is represented in FIG. 8c by the line B—B. It can be seen from FIG. 8b that the bores, shown here in section, in the driver 23 are not filled up by spacer bolts 22 as in FIG. 8a but instead are deeper than the bores in the driver 23 of FIG. 8a. The fastening cap 21 acts centrally on the tearing strips 4, suspended radially and interchangeably on the end face of the plate 2 with fastening protrusions 24, and thus acts centrally on the plate 2 as well.

If the plate 2 is pivoted outward by the pivoting device 13, then the tearing strips 4 can be changed simply by releasing only a single screw fastening of the fastening cap 21. The final position of the motor 3 pivoted by 90°, as shown in FIG. 1, is advantageous in this respect. In this position, even without the fastening cap 21, the tearing strips 4 cannot fall out of the plate 2.

For pivoting the motor 3 outward, a screw fastening or fast-action closure between the flange plate 12 and the cylindrical housing 8 is released, and the structural group comprising the motor 3, flange plate 12, and plate 2 is pivoted outward by the pivoting device 13 disposed on both sides of the motor 3. Once a highest position 25 is overcome, this structural group drops into a position 26. In this position 26, part of the pivoting device 13 is released, and the motor 3 is pivoted upward by 90° and then locked again in the pivoted position.

Figure 2:
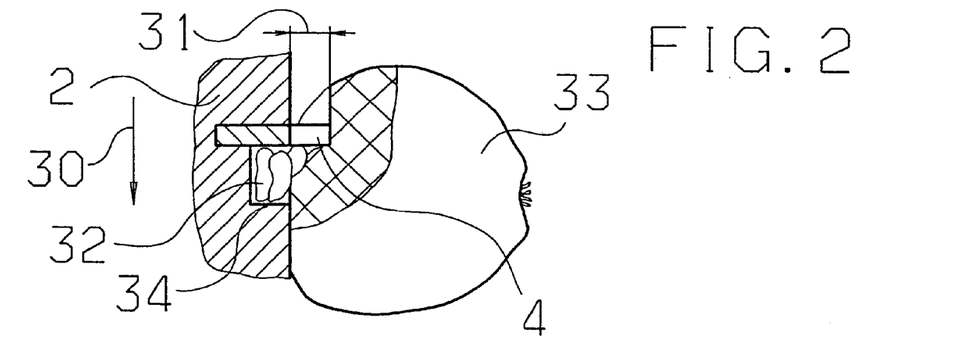
FIG. 2, a cross section through a unilateral groove of rectangular profile next to a tearing element in a turning plate of the tearing mill of FIG. 1.

FIG. 2 shows a cross section through one of the tearing strips 4 disposed radially on the face end of the plate 2 as shown in FIG. 1. As a consequence of the rotation of the plate 2, a motion of the tearing strip 4 downward in the direction of the arrow 30 is assumed. The part of the tearing strip 4 that protrudes by a height 31 beyond the face end of the plate 2 tears pieces 32 out of a fruit 33 stuffed against it by the feed screw 6. These pieces 32 are diverted by a groove 34 of rectangular profile disposed upstream, in the direction of the arrow 30, of the tearing strip 4 in the plate 2. The groove 34 is open on the circumference of the plate 2, so that here the pieces 32 can emerge into the annular channel 14 and the discharge chute 15. What is important is that the mash is mechanically acted upon as little as possible immediately after being separated from the apple, so that the structure of the mash will not be changed.

The term "wrenching" is understood here to mean a partly combined effect of cutting and tearing. The goal is that the pieces 32 wrenched out of a fruit 33 will have the largest possible free surface area so that many fruit cells will be exposed. A large proportion of the cellular juice can then flow freely out, and a juice extraction and pressing operation subsequently performed on the wrenched product is made easier.

Figure 3:
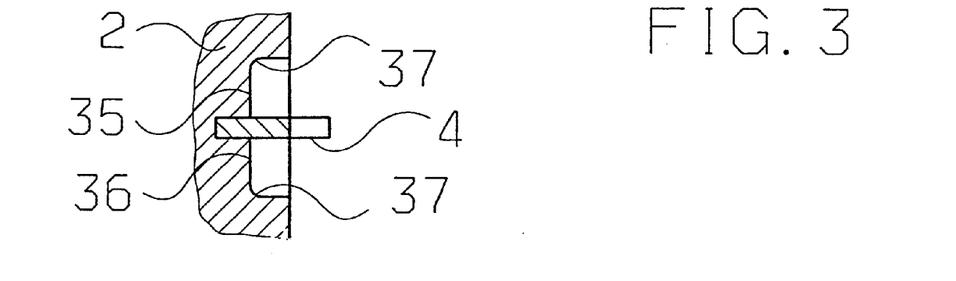
FIG. 3, a cross section through a groove on both sides of a tearing element in a turning plate of the tearing mill of FIG. 1.

The cross section shown in FIG. 3 corresponds to that of FIG. 2, but in FIG. 3 one groove each, 35 and 36, is disposed on either side of the tearing strip 4. This arrangement has the advantage that pieces 32 wrenched out of the fruit 33 in FIG. 2 are carried away in both directions of rotation during operation of the plate 2. In other words, the tearing strips 4 can be used on both sides. The tearing strips 4 typically wear down only wherever they are stressed in the travel direction 30 of the plate 2. If one side becomes dull, then the service life of the tearing strips can be doubled by changing the direction of motion. The grooves 35, 36 are rounded, with a radius 37. This lessens any sticking or wedging of stems and pits of the fruits 33 in the grooves 35, 36.

Figure 4:
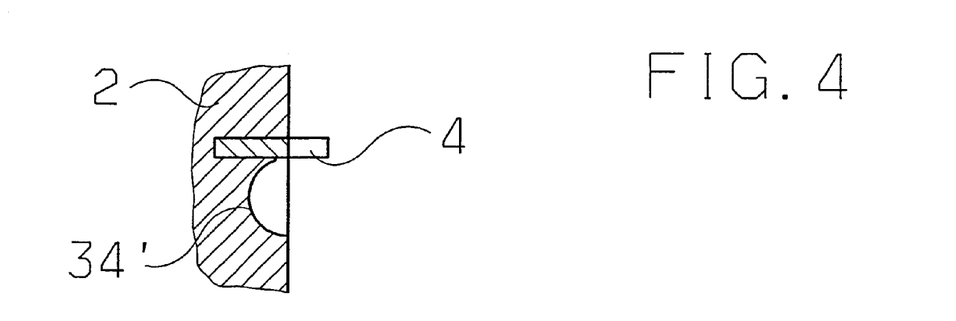
FIG. 4, a cross section through a unilateral groove of round profile next to a tearing element in a turning plate of the tearing mill of FIG. 1.

The cross section shown in FIG. 4 corresponds to that of FIG. 2, but in FIG. 4 the groove 34' is fully rounded. This prevents unwanted deposits or wedging of pieces of the fruits 33 even better.

Figure 5:
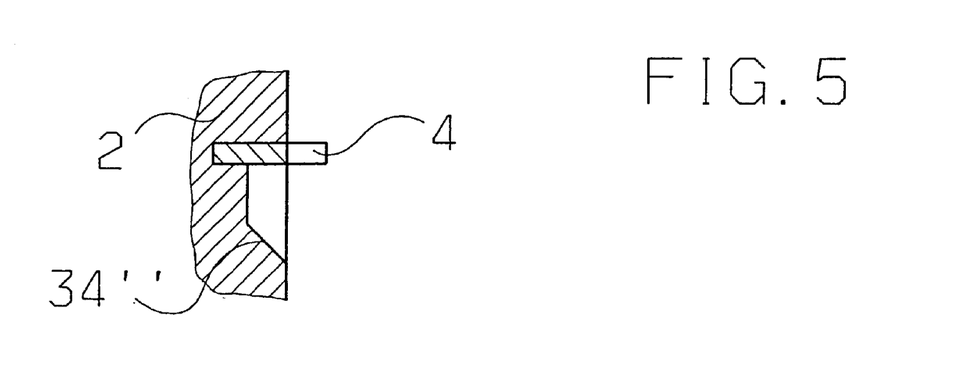
FIG. 5, a cross section through a unilateral groove of beveled profile next to a tearing element in a turning plate of the tearing mill of FIG. 1.

The cross section shown in FIG. 5 also corresponds to that of FIG. 2, but in FIG. 5 the groove 34" is chamfered, which once again prevents solids from wedging in the grooves 34".

FIG. 6 shows a cross section A—A of FIG. 1 through the cylindrical housing 8 of the tearing mill, perpendicular to the axis. Three of the four strips 16 can be seen, which extend as a rotation block over the casing length of the housing 8. The rotation block 17 with the support plate 18 is also shown; it extends over a greater axial range at the outlet 10 of the housing 8 of FIG. 1. The rotation block 17, with or without counterpart teeth to the tearing strips 4, has two functions: first, calming the fruits 33 upstream of the tearing strips 4 by reducing rolling motions, resulting in a better mash structure, and second, stripping off fibers that become caught in the tearing strips 4 and are not spun away. The mash structure becomes more uniform, and the power of the drive motors 3 and 11 is used without loss and in a purposeful way.

Figure 7:
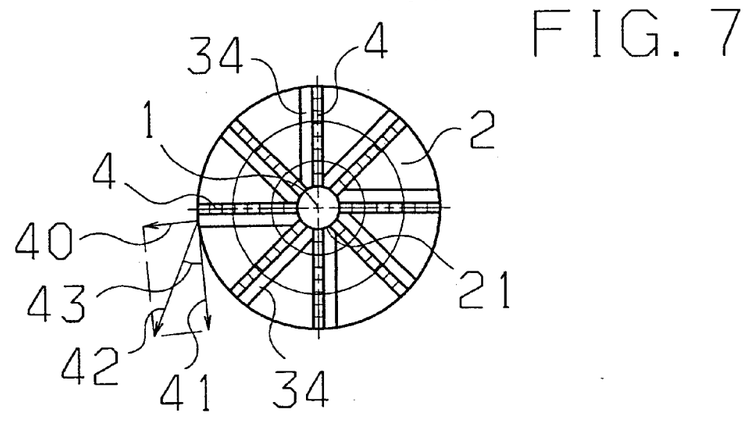
FIG. 7, a plan view on a turning plate of the tearing mill of FIG. 1.

FIG. 7 shows a plan view on the face end of the rotatably supported plate 2 of FIG. 1, with the tearing strips 4 and with immediately adjacent grooves 34 on one side for carrying the product away. The tearing strips 4 are disposed radially, and their extensions meet in the pivot axis 1 of the plate 2. Arrangements are also possible in which the directions of the tearing strips 4 do not point to the pivot axis 1. The number of tearing strips 4 is advantageously between approximately 4 and 40. The tearing strips 4 can also have different lengths. The grooves 34 are located upstream of the tearing strips, in terms of the travel direction. The mash leaves the grooves 34 at a radial speed 40 and a circumferential speed 41, resulting in a speed 42 with an outflow angle 43.

Figure 9:
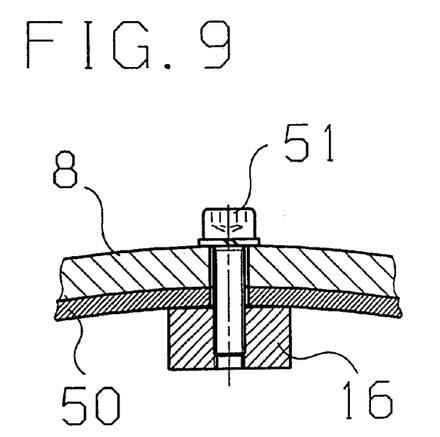
FIG. 9, a detail of an interchangeable wear ring on the cylindrical housing of the stuffing device for delivering product in accordance with FIG. 1, in a cross section perpendicular to the housing axis.
Figure 10:
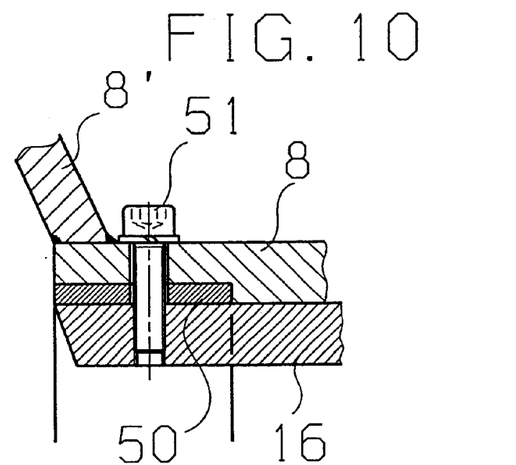
FIG. 10, the detail of FIG. 9, in a cross section parallel to the housing axis.

FIG. 9 shows a detail of an interchangeable wear ring 50 on the cylindrical housing 8 of the stuffing device for delivering product in accordance with FIG. 1, in a cross section perpendicular to the housing axis; FIG. 10 shows the same detail in a cross section parallel to the housing axis. Both cross sections pass through a fastening screw 51, which extends through the wear ring 50 to engage the strip 16. In FIG. 10, the extension 8' of the housing 8 toward the annular channel 14 of FIG. 1 can also be seen.

Since with some grinding products for comminution foreign bodies sometimes get into the tearing mill, the edge of the housing 8 is also subject to severe wear at the grinding gap 19 in FIG. 1. Accordingly, the wear ring 50 on the casing of the housing 8 can also be replaced with the screw fastening 51. The wear ring 50 is advantageously manufactured from a low-wear high-quality steel.

Figure 11:
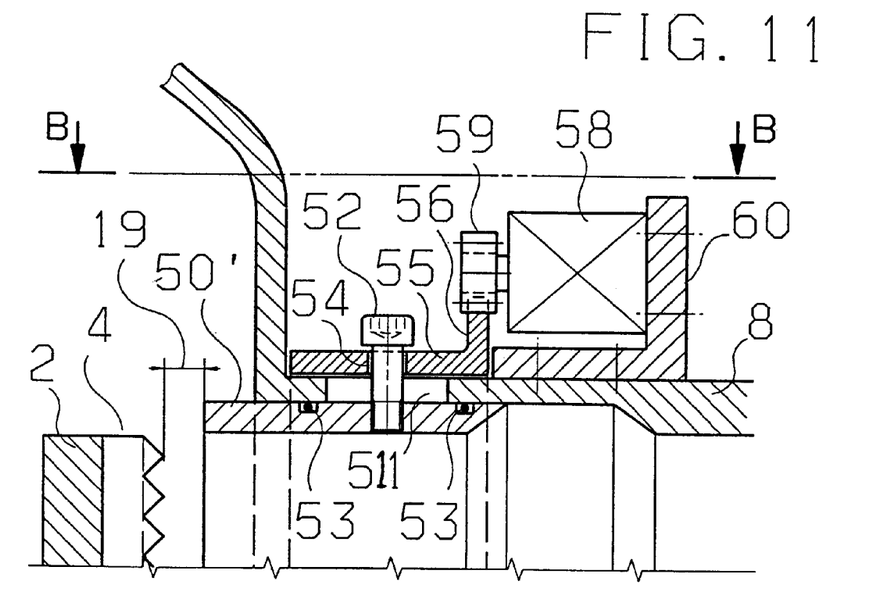
FIG. 11, a radial section through a detail with an axially adjustable wear ring on the cylindrical housing of the stuffing device for product delivery of FIG. 1, for varying a grinding gap between the wear ring and a turning plate of the tearing mill of FIG. 1.
Figure 12:
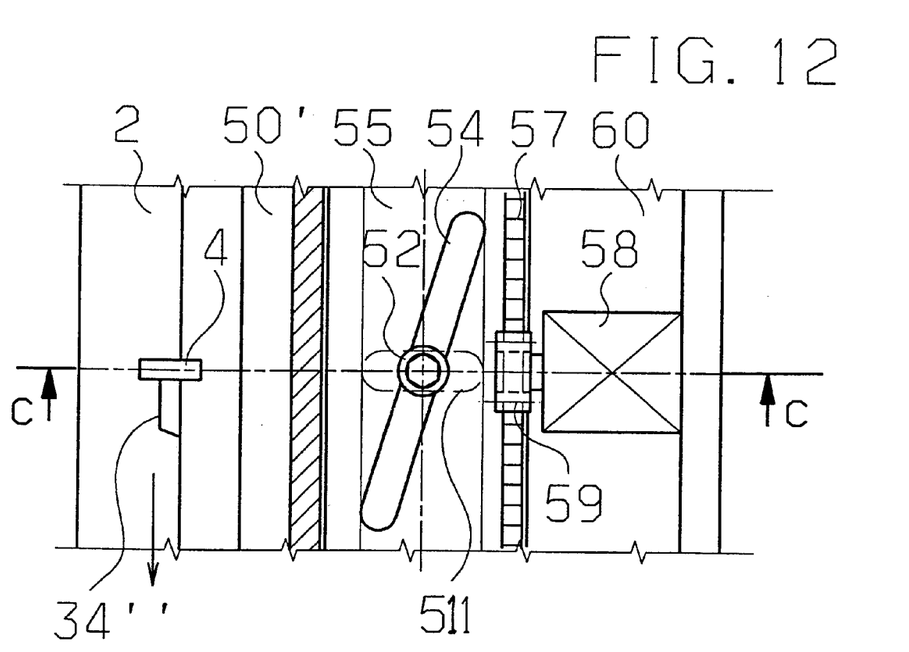
FIG. 12, a radial plan view on the detail of FIG. 11.

FIG. 11 shows a radial section through a detail of an axially adjustable wear ring 50' on the cylindrical housing 8 of the stuffing device for delivering product of FIG. 1. With it, the grinding gap 19 can be adjusted even during operation and automatically. FIG. 12 shows a radial plan view in the direction of the arrows B—B of FIG. 11; the sectional plane of FIG. 11 is marked in FIG. 12 by the arrows C—C. Located along the circumference of the wear ring 50' in the housing 8 are a plurality of slots 511 parallel to the housing axis, by means of which slots bolts 52 screwed into the wear ring 50' are guided. The interior of the housing 8 is sealed off from the outside by two O-rings 53 let into the wear ring 50'.

The bolts 52 also extend through oblique slots 54 in a control ring 55 seated on the outside of the housing 8. The control ring 55, on a flange 56, has a toothed ring 57 driven by a pinion 59 which is driven by a motor 58. The motor 58 is secured to the jacket of the housing 8 via a flange ring 60. The grinding gap 19 is increased or decreased in size depending on the direction of rotation of the motor 58.

Figure 13:
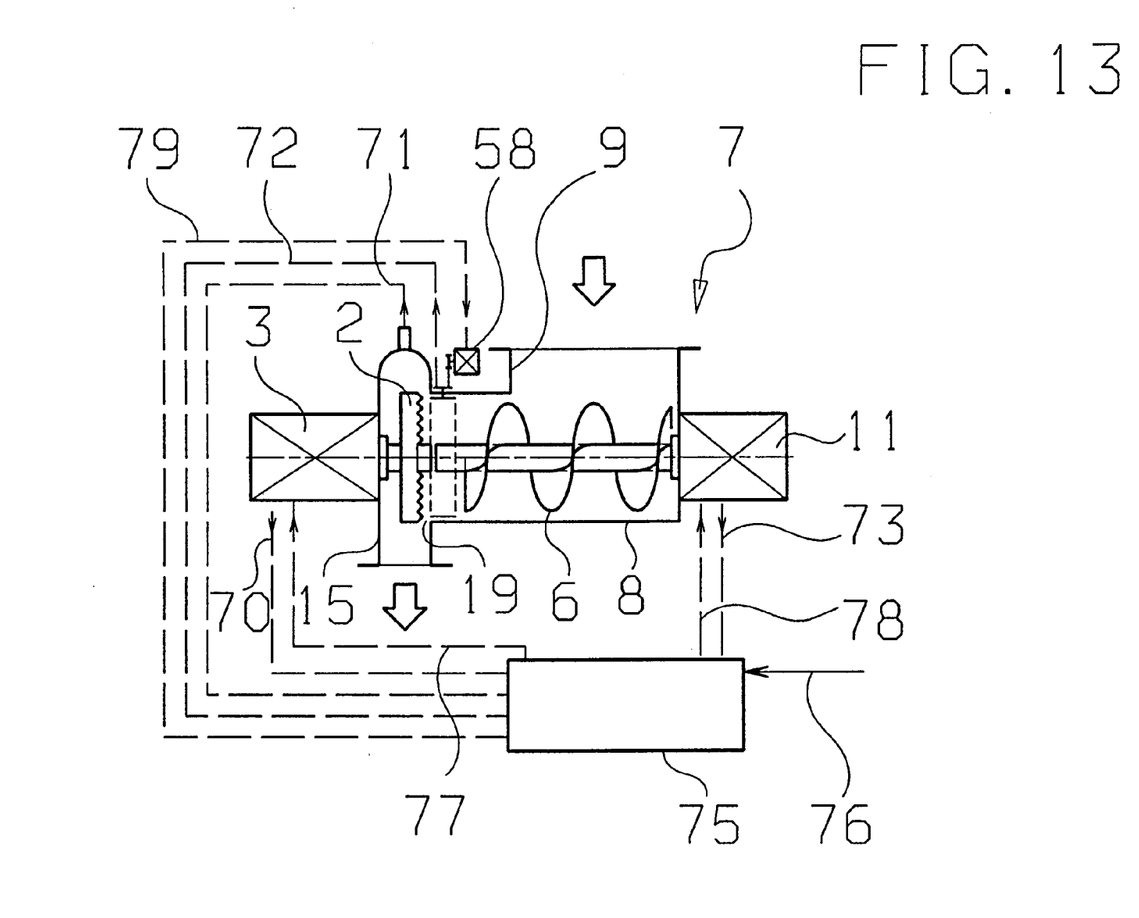
FIG. 13, a diagram of a regulating device with control elements for the tearing mill of FIG. 1, for selecting the structure of the comminuted ground product.

FIG. 13 shows a diagram of a regulating device with control elements for the tearing mill of FIG. 1 for selecting the structure of the comminuted ground product. Components corresponding to FIG. 1 have the same reference numerals in FIG. 13 as in FIG. 1. For detecting the actual state of the tearing mill, the following sensors are provided in accordance with FIG. 13: a sensor for the power consumption of the drive 3 of the plate 2, with a signal line 70; a sensor for detecting the accelerations upon vibration of the tearing apparatus, with a signal line 71; a travel pick-up for the wear ring, for measuring the grinding gap 19, with a signal line 72; and a sensor for the power consumption of the drive 11 of the feed screw 6, with a signal line 73.

As FIG. 13 shows, the signal lines 70, 71, 72, 73 are connected to a regulator 75. Depending on the actual state and on external specifications via a line 76, the regulator 75 generates the following specifications for the tearing mill: an rpm specification for the drive 3 of the plate 2, via a line 77; an rpm specification for the drive 11 of the feed screw 6, via a line 78; and a control for the actuator motor 58 for the grinding gap 19, via a line 79.

With the measurement and control variables described thus far, the following regulating and control functions are attained in the apparatus for comminuting organic substances: Closed-loop control circuit for the torque of the drive for the plate 2. Here the rpm of the plate 2 is specified in fixed form. The torque of the plate drive is measured indirectly through the power consumption, via the line 70. This torque measurement variable is kept constant by varying the rpm of the feed screw 6, as a controlling variable. As the rpm of the screw increases, the torque required by the plate drive also increases.

Variation of the structure of the mash. This structure is varied by adjusting the following parameters during operation of the tearing mill: rpm of the plate 2, size of the grinding gap 19, and power consumption of the drive 3 of the plate 2.

In accordance with the intended object, the following advantages are attained with the apparatus described thus far: By carrying the mash away in the grooves 34 of the plate 2 and in the annular channel 14 of the housing 8, the mash structure is not varied or damaged by the effects of congestion. This results in fewer superfine components in the mash, which in fruit presses cause filter clogging and reduce the press performance.

By means of a wide variability from fine to very coarse in the mash structure, the comminution can be adapted optimally to the pressability and properties of the fruit product. Very soft fruits can accordingly be comminuted very coarsely, while very hard fruits can be comminuted quite finely.

In comparison with the prior art discussed at the outset, a mill with the present comminuting system operates very quietly with little vibration. Such a mill is also very simple to seal off, if very wet products or products with an overpressure are to be processed. No juice or pressure losses then occur. Tightness of the mill is also highly useful when products with volatile solvents are being processed.

When fibrous products are processed, mostly separated fibers are spun off from the teeth of the tearing strips 4. The gaps between teeth do not become plugged with fibers. The tearing performance and the mash structure remain unchanged.

Wearing parts of the mill can be manufactured simply and economically. When foreign bodies such as stones, pieces of wood and the like are involved, damage remains slight.

Variants of the described design and the use of the apparatus for comminuting organic substances are readily available to one skilled in the art. For instance, the structure of the comminuted products can be optimized on an ongoing basis automatically in view of an optimal yield/performance in succeeding pressing operations with the control and regulating means disclosed.

What is claimed is:

1. An apparatus for comminuting organic substance comprising:
    a plate supported rotatably about its axis;
    a motor operatively connected to the plate to rotate the plate about its axis;
    a stuffing device for delivering organic substance toward a face of the plate;
    tearing elements disposed on said face of the plate for separating pieces from the organic substance delivered by the stuffing device during rotation of the plate, the tearing elements extending towards an outer periphery of the plate; and
    a plurality of grooves provided on said face of the plate, each groove being positioned along one side of one of the tearing elements and extending towards the outer periphery of the plate to receive the pieces separated from the organic substance and carry the pieces away towards the outer periphery of the plate during rotation of the plate.

2. The apparatus according to claim 1, wherein the plurality of grooves include a groove positioned on each side of at least some of the tearing elements.

3. The apparatus according to claim 1, wherein the plate has an outer circumference, the grooves opening to the outer circumference of the plate.

4. The apparatus according to claim 1, wherein each of the grooves is positioned immediately adjacent one of the tearing elements.

5. The apparatus according to claim 1, wherein each of the grooves extends radially and is oriented in a direction pointing towards the axis of the plate.

6. An apparatus for comminuting organic substance comprising:
    a plate supported for rotation about its axis;
    a motor operatively connected to the plate to rotate the plate about its axis;
    a housing;
    a feed screw positioned in the housing;
    a motor operatively connected to the feed screw to rotate the feed screw and cause organic substance to be delivered toward a face of the plate;
    tearing elements disposed on said face of the plate to separate pieces from the organic substance delivered by the feed screw during rotation of the plate; and
    a rotation block extending axially along an inner surface of the housing to inhibit rotation of the organic substance being delivered by the feed screw towards the one face of the plate,
    wherein a plurality of circumferentially spaced apart rotation blocks extend axially along the inner surface of the housing, wherein one of the rotation blocks includes a plurality of teeth facing towards the tearing elements to remove fibers from the tearing elements during rotation of the plate.

7. An apparatus for comminuting organic substance comprising:
    a plate supported for rotation about its axis;
    a motor operatively connected to the plate to rotate the plate about its axis;
    a housing;
    a feed screw positioned in the housing;
    a motor operatively connected to the feed screw to rotate the feed screw and cause organic substance to be delivered toward a face of the plate;
    tearing elements disposed on said face of the plate to separate pieces from the organic substance delivered by the feed screw during rotation of the plate; and
    a rotation block extending axially along an inner surface of the housing to inhibit rotation of the organic substance being delivered by the feed screw towards the one face of the plate, wherein a plurality of circumferentially spaced apart rotation blocks extend axially along the inner surface of the housing, wherein each of the tearing elements includes a plurality of teeth.

8. An apparatus for comminuting organic substance comprising:

a plate supported for rotation about its axis;

a motor operatively connected to the plate to rotate the plate about its axis;

a housing;

a feed screw positioned in the housing;

a motor operatively connected to the feed screw to rotate the feed screw and cause organic substance to be delivered toward a face of the plate;

tearing elements disposed on said face of the plate to separate pieces from the organic substance delivered by the feed screw during rotation of the plate; and a rotation block extending axially along an inner surface of the housing to inhibit rotation of the organic substance being delivered by the feed screw towards the one face of the plate, wherein the rotation block includes a plurality of teeth facing towards the tearing elements to remove fibers from the tearing elements during rotation of the plate.

9. An apparatus for comminuting organic substance comprising:

a plate supported rotatably about its axis;

a motor operatively connected to the plate to rotate the plate about its axis;

tearing elements disposed on a face of the plate;

a stuffing device for delivering organic substance toward the face of the plat the stuffing device including a housing; and a pivoting device pivotally mounting the plate and the motor to permit the plate and the motor to be pivoted away from the housing.

10. The apparatus according to claim 9, wherein the tearing elements are removably mounted on the plate, the pivoting device permitting the plate and the motor to be pivoted away from the housing to a position allowing the tearing elements to be removed.

11. The apparatus according to claim 10, wherein the tearing elements are removably mounted on the plate by way of a fastening cap.

12. The apparatus according to claim 9, wherein the stuffing device includes a feed screw positioned within the housing, the housing having an inlet for introducing the organic substance and an outlet, the housing extending beyond the outlet, the pivoting device permitting the motor and the plate to be pivoted away from a position in which the plate is located opposite the outlet and is surrounded by a portion of the housing.

13. An apparatus for comminuting organic substance comprising:

a plate supported rotatably about it axis;

a first motor operatively connected to the plate to rotate the plate about its axis;

a rotatable feed screw for delivering organic substance to a face of the plate;

a second motor operatively connected to the feed screw to rotate the feed screw and deliver organic substance toward a face of the plate;

tearing elements disposed on said face of the plate for separating pieces from the organic substance delivered by the stuffing device during rotation of the plate;

a first sensor determining power consumption of the first motor;

a second sensor determining power consumption of the second motor; and a regulator connected to the first and second sensors for receiving signals from the first and second sensors indicating the power consumption of the first and second motors and connected to the first and second motors to adjust a rotational speed of the feed screw and a rotational speed of the plate independently of one another based on the signals received from the first and second sensors.

14. The apparatus according to claim 13, including a third sensor connected to the regulator to detects vibration of the apparatus during operation, the regulator stopping operation of the first and second motors if a predetermined limit value for the vibration is exceeded.

15. An apparatus for comminuting organic substance comprising:

a housing having an outlet;

a feed screw positioned in the cylindrical housing;

a plate mounted on a shaft for rotation about an axis of the shaft, the plate being located opposite the outlet of the housing at a position defining a grinding gap;

the shaft including a driver, the driver and the plate being provided with a plurality of holes;

a plurality of spacer bolts extending between the plate and the driver, each of the spacer bolts being positioned in one of the holes in the plate and one of the holes in the driver;

at least some of the holes in either the plate or the driver being of different depth than others of the holes to permit the grinding gap to be varied by changing the holes into which the spacer bolts are positioned;

a first motor operatively connected to the plate to rotate the plate about its axis;

a second motor operatively connected to the feed screw to rotate the feed screw and cause organic substance to be delivered toward a face of the plate; and tearing elements disposed on said face of the plate to separate pieces from the organic substance delivered by the feed screw during rotation of the plate.

16. The apparatus according to claim 15, wherein the holes in the driver are greater in number than the number of spacer bolts, and the holes in the plate are greater in number than the number of spacer bolts.

17. An apparatus for comminuting organic substance comprising:

a plate supported rotatably about it axis;

a first motor operatively connected to the plate to rotate the plate about its axis;

a rotatable feed screw;

a second motor operatively connected to the feed screw to rotate the feed screw and cause organic substance to be delivered toward a face of the plate tearing elements removably disposed on said face of the plate for separating pieces from the organic substance delivered by the feed screw during rotation of the plate; and a fastening cap engaging each of the tearing elements to press the tearing elements to the plate, the fastening cap being adjustable to move the fastening cap away from the plate to permit removal of the tearing elements from the plate.

18. The apparatus according to claim 17, wherein the fastening cap is adjustable by way of a screw.

19. The apparatus according to claim 17, wherein the plate is supported on a shaft, and the fastening cap is adjustable by way of a screw that engages the shaft.

20. The apparatus according to claim 17, wherein the tearing elements are removably disposed on the plate by way of protrusions.

21. The apparatus according to claim 20, wherein the protrusions are provided on the tearing elements.

22. An apparatus for comminuting organic substance comprising:

a plate supported for rotation about its axis;

a motor operatively connected to the plate to rotate the plate about its axis;

a housing;

only a single feed screw positioned in the housing, an axis of the feed screw being substantially coaxial with the axis of the plate;

a motor operatively connected to the feed screw to rotate the feed screw in a direction opposite a direction of rotation of the plate and cause organic substance to be delivered toward a face of the plate;

tearing elements disposed on said face of the plate to separate pieces from the organic substance delivered by the feed screw during rotation of the plate; and a rotation block extending axially along an inner surface of the housing to inhibit rotation of the organic substance being delivered by the feed screw towards the one face of the plate.

* * * * *